US009825269B2

United States Patent
Kim et al.

(10) Patent No.: US 9,825,269 B2
(45) Date of Patent: Nov. 21, 2017

(54) POROUS POLYOLEFIN SEPARATOR AND METHOD FOR MANUFACTURING THE SAME

(71) Applicant: SAMSUNG SDI CO., LTD., Yongin-si, Gyeonggi-do (KR)

(72) Inventors: Kee Wook Kim, Suwon-si (KR); Sang Ho Lee, Suwon-si (KR); Yong Bae Lee, Suwon-si (KR); Jung Seong Lee, Suwon-si (KR); Jung Sue Jang, Suwon-si (KR); Jae Hyun Cho, Suwon-si (KR); Dae Hyun Hong, Suwon-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 340 days.

(21) Appl. No.: 14/578,994

(22) Filed: Dec. 22, 2014

(65) Prior Publication Data

US 2015/0179999 A1    Jun. 25, 2015

(30) Foreign Application Priority Data

Dec. 20, 2013  (KR) .................. 10-2013-0160502
Jul. 15, 2014  (KR) .................. 10-2014-0088818

(51) Int. Cl.
| | |
|---|---|
| *H01M 2/16* | (2006.01) |
| *H01M 2/14* | (2006.01) |
| *C08J 5/18* | (2006.01) |
| *C08J 7/04* | (2006.01) |
| *B29C 55/14* | (2006.01) |

(52) U.S. Cl.
CPC ......... *H01M 2/1653* (2013.01); *B29C 55/143* (2013.01); *C08J 5/18* (2013.01); *C08J 7/047* (2013.01); *H01M 2/145* (2013.01); *H01M 2/1686* (2013.01); *C08J 2323/06* (2013.01); *C08J 2427/16* (2013.01)

(58) Field of Classification Search
CPC ... H01M 2/1653; H01M 2/145; B29C 55/143; C08J 7/047; C08J 5/18
See application file for complete search history.

(56) References Cited

U.S. PATENT DOCUMENTS

| | | | |
|---|---|---|---|
| 8,058,348 B2 * | 11/2011 | Takeda ................... | B01D 71/26 429/247 |
| 8,231,999 B2 * | 7/2012 | Teshima .............. | H01M 2/1653 429/145 |
| 8,283,073 B2 * | 10/2012 | Ikemoto .............. | H01M 2/1653 428/315.5 |
| 2011/0262814 A1 * | 10/2011 | Ikemoto ..................... | C08J 5/18 429/249 |

FOREIGN PATENT DOCUMENTS

| | | | |
|---|---|---|---|
| KR | 10-2012-0063876 A | | 6/2012 |
| KR | 1020120063876 | * | 6/2012 |

OTHER PUBLICATIONS

Korean Office Action dated Feb. 12, 2016 in Corresponding Korean Patent Application No. 10-2014-0088818.

* cited by examiner

*Primary Examiner* — Ula C Ruddock
*Assistant Examiner* — Thomas Parsons
(74) *Attorney, Agent, or Firm* — Lee & Morse, P.C.

(57) ABSTRACT

A method for manufacturing a polyolefin separator, including forming a sheet including a polyolefin resin and a plasticizer; stretching the sheet $E_1$ times in a longitudinal direction at a temperature of $T_1$, followed by stretching the sheet $E_2$ times in a transverse direction at a temperature of $T_2$, wherein $T_1 < 115°$ C., $T_2 < 115°$ C., and $T_2 \geq T_1$, and $E_1 \times E_2 = 55$ to $80$, $E_1 \geq 7$, and $E_2 \geq 7$; and extracting the plasticizer from the stretched sheet.

20 Claims, 1 Drawing Sheet

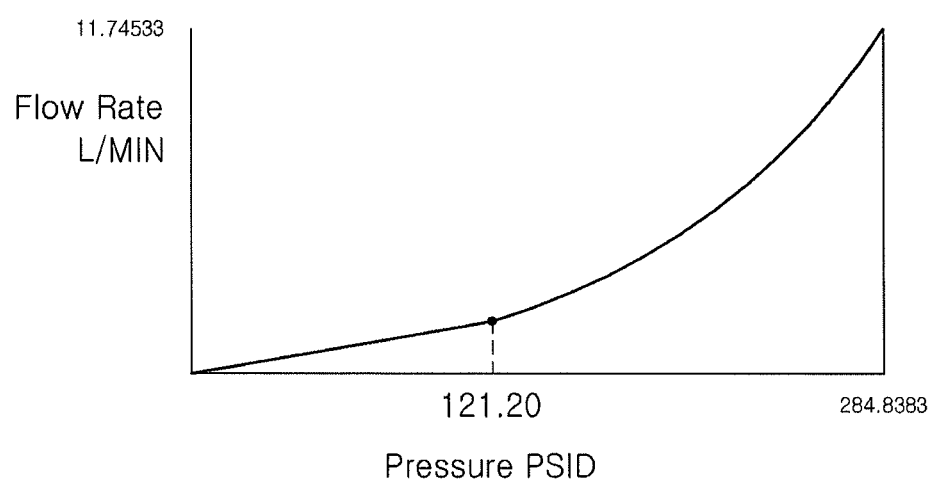

POROUS POLYOLEFIN SEPARATOR AND METHOD FOR MANUFACTURING THE SAME

CROSS-REFERENCE TO RELATED APPLICATIONS

Korean Patent Application No. 10-2013-0160502, filed on Dec. 20, 2013, and Korean Patent Application No. 10-2014-0088818, filed on Jul. 15, 2014, in the Korean Intellectual Property Office, and entitled: "Porous Polyolefin Separator and Method for Manufacturing the Same," are incorporated by reference herein in their entirety.

BACKGROUND

1. Field

Provided are a porous polyolefin separator and a method for manufacturing the same.

2. Description of the Related Art

A separator for electrochemical batteries is an intermediate membrane that allows ionic conductivity to be continuously maintained, and enables charge and discharge of a battery while isolating a cathode and an anode in the battery.

SUMMARY

Embodiments may be realized by providing a method for manufacturing a polyolefin separator, including forming a sheet including a polyolefin resin and a plasticizer; stretching the sheet $E_1$ times in a longitudinal direction at a temperature of $T_1$, followed by stretching the sheet $E_2$ times in a transverse direction at a temperature of $T_2$, wherein $T_1 < 115°$ C., $T_2 < 115°$ C., and $T_2 \geq T_1$, and $E_1 \times E_2 = 55$ to 80, $E_1 \geq 7$, and $E_2 \geq 7$; and extracting the plasticizer from the stretched sheet.

A ratio of $E_1/E_2$ may range from 0.85 to 1.

The polyolefin resin may include one or more of a high-density polyethylene having a viscosity average molecular weight from $1 \times 10^5$ g/mol to $9 \times 10^5$ g/mol or an ultrahigh-molecular weight polyethylene having a viscosity average molecular weight of $9 \times 10^5$ g/mol or more.

The method may further include performing heat setting after extracting the plasticizer.

Performing heat setting may include stretching the sheet in a ratio of 1 to 2 times in the transverse direction and relaxing the sheet to 80% to 100% with respect to the length of the sheet stretched in the transverse direction.

The method may further include forming a coating layer on one or both surfaces of the polyolefin separator after extracting the plasticizer or after heat setting.

Embodiments may be realized by providing a polyolefin separator, including a polyolefin resin, the polyolefin separator having a first inflection point of 110 psi or more on a drying curve of the separator as measured using a capillary flow porometer.

The polyolefin separator may, further include a coating layer on one or both surfaces of the polyolefin separator.

The polyolefin separator may have porosity of 40% to 60%.

The polyolefin separator may have an air permeability of 5 sec/100 cc·μm to 15 sec/100 cc·μm.

The polyolefin separator may have an air permeability change of 6% or less after compression thereof, as represented by Equation 1:

$$\text{air permeability change after compression} = [(P_1 - P_0)/P_0] \times 100 \quad (1),$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

The polyolefin resin may include one or more of a high-density polyethylene having a viscosity average molecular weight from $1 \times 10^5$ g/mol to $9 \times 10^5$ g/mol or an ultrahigh-molecular weight polyethylene having a viscosity average molecular weight of greater than $9 \times 10^5$ g/mol.

The polyolefin separator may be stretched $E_1$ times in a longitudinal direction at a temperature of $T_1$ and then stretched $E_2$ times in a transverse direction at a temperature of $T_2$, wherein $T_1 < 115°$ C., $T_2 < 115°$ C., and $T_2 \geq T_1$, and $E_1 \times E_2 = 55$ to 80, $E_1 \geq 7$, and $E_2 \geq 7$.

A ratio of $E_1/E_2$ may range from 0.85 to 1.

Embodiments may be realized by providing an electrochemical battery, including the presently disclosed polyolefin separator.

Embodiments may be realized by providing a polyolefin separator, including a polyolefin resin, the polyolefin separator having an air permeability change of 6% or less after compression thereof, as represented by Equation 1:

$$\text{air permeability change after compression} = [(P_1 - P_0)/P_0] \times 100 \quad (1),$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

The polyolefin separator may further include a coating layer on one or both surfaces of the polyolefin separator.

BRIEF DESCRIPTION OF THE DRAWING

Features will become apparent to those of skill in the art by describing in detail exemplary embodiments with reference to the attached drawing in which:

FIG. 1 illustrates a capillary flow porometer (PMI Co., Ltd.) drying graph measured on a separator according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Hereinafter, a method for manufacturing a porous polyolefin separator according to an embodiment will be described in detail. The method for manufacturing a porous polyolefin separator may include: forming a cooled solidified sheet by melting and kneading a composition including a polyolefin resin and a plasticizer, followed by extrusion; stretching the solidified sheet $E_1$ times in a longitudinal direction at a temperature of $T_1$, followed by stretching the solidified sheet $E_2$ times in a transverse direction at a temperature of $T_2$; and extracting the plasticizer from the stretched sheet, wherein stretching is performed under stretching temperature conditions of $T_1$<115° C., $T_2$<115° C., and $T_2 \geq T_1$ and under stretching ratio conditions of $E_1 \times E_2$=55 to 80, $E_1 \geq 7$, and $E_2 \geq 7$. A separator manufactured by the method may exhibit a small change in properties, for example, due to small deformation and size change of pores, which may be caused by external environments, and may improve battery stability.

First, formation of the solidified sheet may include, for example, forming the cooled solidified sheet by melting and kneading the composition including the polyolefin resin and the plasticizer, followed by extrusion.

The polyolefin resin is a resin including a polyolefin and may include, for example, one or more of an ultrahigh-molecular weight polyethylene, a high-molecular weight polyethylene, a high-density polyethylene, a low-density polyethylene, a linear low-density polyethylene, a polypropylene, a high crystalline polypropylene, or a polyethylene-propylene copolymer. In an example, the polyolefin resin may include another resin in addition to the polyolefin. Examples of the other resin include polyimides, polyesters, polyamides, polyether imides, polyamide imides, and polyacetals. When the polyolefin resin includes the other resin, a polyolefin resin composition may be prepared by blending the polyolefin resin and the other resin in an appropriate solvent. In a further example, the polyolefin resin may include a copolymer of olefin and non-olefin monomers. The high-density polyethylene may have a viscosity average molecular weight (Mv) of $1 \times 10^5$ g/mol to $9 \times 10^5$ g/mol, for example, $3 \times 10^5$ g/mol to $6 \times 10^5$ g/mol. The ultrahigh-molecular weight polyethylene may have a viscosity average molecular weight of $9 \times 10^5$ g/mol or more, for example, $9 \times 10^5$ g/mol to $5 \times 10^6$ g/mol. For example, the high-density polyethylene may be used alone, the ultrahigh-molecular weight polyethylene may be used alone, or both the high-density polyethylene and the ultrahigh-molecular weight polyethylene may be used. For example, the ultrahigh-molecular weight polyethylene may be present in an amount of 30% by weight (wt %) or less based on the weight of the polyolefin resin. For example, the polyolefin resin may be a polyolefin resin which includes 70 wt % or more of the high-density polyethylene having a viscosity average molecular weight of $1 \times 10^5$ g/mol to $9 \times 10^5$ g/mol and 30 wt % or less of the ultrahigh-molecular weight polyethylene having a viscosity average molecular weight of $9 \times 10^5$ g/mol or more. The polyolefin resin advantageously provides high strength to the separator. When the polyolefin resin includes at least two polyolefin resins, it may be advantageous to mix the resins using one or more of a Henschel mixer, a Banbury mixer, or a planetary mixer.

The plasticizer may be an organic compound forming a single phase with the polyolefin resin at an extrusion temperature. Examples of the plasticizer include: aliphatic or cyclic hydrocarbons such as, for example, nonane, decane, decaline, liquid paraffin (or paraffin oil), and paraffin wax; phthalic acid esters such as, for example, dibutyl phthalate and dioctyl phthalate; $C_{10}$ to $C_{20}$ fatty acids such as, for example, palmitic acid, stearic acid, oleic acid, linoleic acid, and linolenic acid; and $C_{10}$ to $C_{20}$ fatty acid alcohols such as, for example, palmitic acid alcohol, stearic acid alcohol, and oleic acid alcohol. These may be used alone or in combination thereof. For example, the plasticizer may be liquid paraffin. Liquid paraffin may be harmless to humans, may have high boiling point, may include a small amount of volatile components, and may be suitable for use as the plasticizer in wet methods.

The composition including the polyolefin resin and the plasticizer may be subjected to melting and kneading at 150° C. to 250° C. The melted and kneaded composition may be injected into a twin-screw extruder, and may be extruded at 150° C. to 250° C. Next, the extruded polyolefin resin may be cooled using a casting roll at 20° C. to 80° C. or forcibly cooled by cool air jetted from an air knife to be crystallized, and may be a solidified sheet may be formed. The cool air jetted from the air knife may have a temperature of −20° C. to 40° C.

Next, the solidified sheet may be subjected to biaxial stretching in which the sheet may be stretched $E_1$ times in a longitudinal direction (Machine Direction or MD) at a temperature of $T_1$ and then stretched $E_2$ times in a transverse direction (TD; perpendicular to the MD) at a temperature of $T_2$. Pores may be formed in the cooled solidified sheet by this stretching process, and size of the pores and porosity may be adjusted depending upon stretching conditions.

For example, stretching temperature conditions may include $T_1$<115° C., $T_2$<115° C., and $T_2 \geq T_1$. Porosity may be increased if both the MD stretching temperature ($T_1$) and the TD stretching temperature ($T_2$) are less than 115° C. Deviation in stretching length of each portion may occur if stretching is performed under the condition that the MD stretching temperature ($T_1$) is equal to or less than the TD stretching temperature ($T_2$). If TD stretching is then performed, two or more kinds of pores having a different size may be formed in the separator. In the two or more kinds of pores having a different size, the relatively small-size pores are advantageous in terms of thermal shrinkage, strength and pore strain, and the relatively large-size pores are advantageous in terms of air permeability, electrolyte wettability and battery capacity. Stretching ratio conditions may include $E_1 \times E_2$=55 to 80, $E_1 \geq 7$, and $E_2 \geq 7$. As to the stretching ratio, if both the MD stretching ratio (E1) and the TD stretching ratio (E2) are 7 times or more and the area stretching ratio ($E_1 \times E_2$) is 55 to 80, deformation and change in size of the pores that may be caused by external pressure applied to the separator may be minimized, for example, due to high area stretching ratio, and battery stability may be improved.

Stretching may be performed under the stretching temperature and stretching ratio conditions as set forth above, and deformation and change in size of the pores that may be caused by external pressure may be minimized and the separator may exhibit excellent properties in terms of mechanical properties, air permeability, thermal shrinkage and air permeability change after compression. The MD stretching temperature ($T_1$) may be lower than the TD stretching temperature ($T_2$) by 1° C. or more, for example, 2° C. or more, 3° C. or more, or 5° C. or more.

In one example, the MD stretching ratio ($E_1$) may be 7 times and the TD stretching ratio ($E_2$) may be 8 times; the MD stretching ratio ($E_1$) may be 7.5 times and the TD stretching ratio ($E_2$) may be 7.5 times; the MD stretching ratio ($E_1$) may be 8 times and the TD stretching ratio ($E_2$) may be 8 times; the MD stretching ratio ($E_1$) may be 8 times and the TD stretching ratio ($E_2$) may be 8.5 times; or the MD stretching ratio ($E_1$) may be 8.5 times and the TD stretching ratio ($E_2$) may be 8.5 times. The transverse and longitudinal stretching ratios may be the same or different. For example, $E_2/E_1$ may range from 0.85 to 1. Maintaining $E_2/E_1$ within this range may help further reinforce an effect of deviation in stretching length of each portion that may be caused by different MD and TD stretching temperatures.

After biaxial stretching, the plasticizer may be extracted. When the plasticizer is extracted after stretching, stretching may be uniformly performed at a lower temperature. In an embodiment, stretching may also be performed after extraction of the plasticizer.

Extraction of the plasticizer may be performed using an organic solvent. For example, extraction of the plasticizer may be performed by dipping the separator subjected to longitudinal stretching and transverse stretching into an organic solvent inside a plasticizer extractor. The organic solvent used in extraction of the plasticizer may be a solvent capable of extracting the plasticizer. Examples of the organic solvent include methyl ethyl ketone, methylene chloride, and hexane, which may exhibit high extraction efficiency and may be easily dried. When liquid paraffin is used as the plasticizer, the organic solvent may be methylene chloride. Organic solvents used in extraction of plasticizer may be highly volatile and noxious, and water may be used to suppress volatilization of the organic solvents.

Hereinafter, a method for manufacturing a separator according to an embodiment will be described in detail. The manufacturing method may further include performing heat setting after extraction of the plasticizer. The manufacturing method is substantially the same as the manufacturing method described above except for heat setting, and a heat setting process will be mainly described in detail hereinafter. Residual stress of a film may be relieved by heat setting, and a final film may exhibit reduced shrinkage and improved thermal stability. Thermal shrinkage or permeability of the film, for example, may be adjusted depending upon temperature and heat setting ratio upon heat setting.

For example, performing heat setting may include stretching the film in a ratio of 1 to 2 times an original length thereof in a transverse direction and relaxing the stretched film to 80% to 100% with respect to the length of the stretched film in the transverse direction. Heat setting may be performed at 100° C. to 150° C., for example, 120° C. to 140° C. Maintaining a temperature within this range may help heat setting effectively remove residual stress of the film, and mechanical and thermal properties of the separator may be improved.

Hereinafter, a method for manufacturing a separator according to a further embodiment will be described in detail. The manufacturing method may further include forming a coating layer on one or both surfaces of the separator manufactured by the methods described above. The manufacturing method is substantially the same as the manufacturing method according to the above embodiments except for formation of the coating layer, and a coating process will be mainly described in detail hereinafter.

Formation of the coating layer may be performed by coating a coating composition including an organic binder and a solvent onto one or both surfaces of the polyolefin separator.

First, the coating composition may be prepared by mixing the organic binder and the solvent, followed by stirring at 10° C. to 40° C. for 30 minutes to 5 hours. The coating composition may have a solid content of 10 parts by weight to 20 parts by weight.

For example, the organic binder may include one or more of a polyvinylidene fluoride (PVdF) homopolymer, a polyvinylidene fluoride-hexafluoropropylene copolymer (PVdF-HFP), polymethylmethacrylate, polyacrylonitrile, polyvinylpyrrolidone, polyvinyl acetate, polyethylene oxide, cellulose acetate, cellulose acetate butyrate, cellulose acetate propionate, cyanoethylpullulan, cyanoethyl polyvinyl alcohol, cyanoethylcellulose, cyanoethyl sucrose, pullulan, carboxyl methylcellulose, or an acrylonitrile-styrene-butadiene copolymer. These may be used alone or in combination thereof. For example, the organic binder may be, for example, a PVdF binder, and the PVdF binder may have a weight average molecular weight (Mw) of 500,000 g/mol to 1,500,000 g/mol. Two or more PVdF binders having different weight average molecular weights may be mixed and used. For example, at least one PVdF binder having a weight average molecular weight of 1,000,000 g/mol or less and at least one PVdF binder having a weight average molecular weight of 1,000,000 g/mol or more may be mixed and used. Maintaining the molecular weight of a PVdF binder within this range may help enhance adhesion between the coating layer and the polyolefin separator, the polyolefin separator vulnerable to heat may be effectively suppressed from shrinking, for example, due to heat, and a separator having sufficiently improved electrolyte impregnation properties may be manufactured and a battery providing efficient electric output may be produced using the separator. The PVdF binder may include, for example, one or more of a polyvinylidene fluoride (PVdF) homopolymer or a polyvinylidene fluoride-hexafluoropropylene (PVdF-HFP) copolymer. In an embodiment, a polyvinylidene fluoride (PVdF) homopolymer having a weight average molecular weight of 1,000,000 g/mol or more, and a polyvinylidene fluoride-hexafluoropropylene (PVdF-HFP) copolymer having a weight average molecular weight of 800,000 g/mol or less may be mixed and used, and adhesion of the coating layer to electrodes and to the polyolefin separator may be improved.

Examples of the solvent include dimethyl formamide, dimethyl sulfoxide, dimethyl acetamide, dimethyl carbonate, and N-methylpyrrolidone. The solvent may be present in an amount of 20 wt % to 99 wt %, for example, 50 wt % to 95 wt % or 70 wt % to 95 wt %, based on the weight of the coating composition. Maintaining the amount of solvent within this range may help provide a coating agent that may be easily prepared, and drying of the coating layer may be facilitated.

The coating composition may further include inorganic particles. Pores may be easily formed in the coating layer and heat resistance of the coating layer may be improved. When the coating composition further includes the inorganic particles, the coating composition may be formed by mixing the organic binder, the inorganic particles and the solvent, followed by stirring at 10° C. to 40° C. for 30 minutes to 5 hours. In an embodiment, the coating composition may be prepared by preparing an inorganic dispersion in which the inorganic particles are dispersed in a dispersive medium, followed by mixing the inorganic dispersion with a polymer solution containing the organic binder and the solvent. The solution obtained by dissolving the organic binder in an appropriate solvent and the inorganic dispersion obtained by dispersion of the inorganic particles may each be prepared, followed by mixing the solution and the inorganic dispersion with an appropriate solvent, and the coating composition may be prepared. As described above, when the inorganic dispersion is separately prepared, dispersibility of the inorganic particles and the binder, and prepared liquid stability may be improved. The solvent suitable for dispersion of the inorganic particles may be, for example, acetone. Mixing may be performed using, for example, a ball mill, a beads mill, or a screw mixer. Examples of the inorganic particles include $Al_2O_3$, $SiO_2$, $B_2O_3$, $Ga_2O_3$, $TiO_2$, and $SnO_2$. These may be used alone or in combination thereof. The inorganic particles may be, for example, $Al_2O_3$ (alumina). The inorganic particles may have an average diameter, for example, from 1 nm to 2,000 nm or from 100 nm to 500 nm.

Maintaining the average diameter of the inorganic particles within this range may help prevent deterioration in dispersibility of the inorganic particles within the coating liquid and in coating processability, the thickness of the coating layer may be appropriately adjusted, and deterioration in mechanical properties and increase in electrical resistance may be prevented. The size of the pores created in the separator may be appropriately adjusted to reduce a possibility of internal short-circuit upon charge and discharge of a battery. In the solids of the coating composition, a weight ratio of the binder to the inorganic particles may range from 3:7 to 0.5:9.5. Maintaining the coating composition to contain the inorganic particles within this range may help the inorganic particles to exhibit sufficient heat dissipation, and thermal shrinkage of the separator may be effectively suppressed when the separator is coated with the composition.

Next, the coating layer may be formed by coating the coating composition onto one or both surfaces of the polyolefin separator.

The coating method for coating the coating composition onto the polyolefin separator may include, for example, dip coating, die coating, roll coating, and comma coating. These methods may be used alone or in combination thereof. The coating layer may be formed by, for example, dip coating.

The coating layer may have a thickness of 0.01 μm to 20 μm, for example, 1 μm to 10 μm or 1 μm to 5 μm. Maintaining the thickness within this range may help formation of the coating layer to an appropriate thickness to exhibit excellent thermal stability and adhesion, the overall separator may be prevented from being excessively thicken, and an increase in internal resistance of a battery may be suppressed.

Drying of the coating layer may be performed by, for example, air drying using warm air, hot air or low-humidity air, vacuum drying, and far infrared or electron beam irradiation. Although drying temperature varies depending upon the kind of solvent, drying may be performed at a temperature of 60° C. to 120° C. Although drying time also varies depending upon the kind of solvent, drying may be performed for 1 minute to 1 hour. In an embodiment, the coating layer may be dried at 90° C. to 120° C. for 1 minute to 30 minutes or for 1 minute to 10 minutes.

Hereinafter, a polyolefin separator according to an embodiment will be described in detail. The polyolefin separator may be manufactured by the method for manufacturing a polyolefin separator according to embodiments described above. The polyolefin separator may contain a polyolefin resin, and may have a first inflection point of 110 psi or more on a drying curve of the separator as measured using a capillary flow porometer. When the first inflection point on the capillary flow porometer drying curve is 110 psi or more, deformation and change in size of pores of the separator may be small, and deterioration in properties of the separator that may be caused by change in external environments may be suppressed and battery stability may be improved.

In relation to the first inflection point on the capillary flow porometer drying curve, for example, when a 26 mm diameter separator is mounted on a capillary flow porometer (PMI Co., Ltd.) and change in flux of $N_2$ depending upon pressure is depicted as a graph, the graph shows a straight line having a constant slope from the origin to a specific point and shows a curved shape having a varying slope after the specific point, as shown in FIG. 1. A pressure at a point at which the graph changes from the straight line having a constant slope to the curved shape having a non-constant slope for the first time will be referred to as an inflection point.

FIG. 1 illustrates a capillary flow porometer drying graph measured on a separator according to an embodiment. The graph illustrates a straight line shape having a constant slope from the origin to a first inflection point corresponding to a pressure of 121.20 psi, and illustrates a curved shape having a varying slope after the inflection point. Deformation or change in size of pores of the separator may occur after the first inflection point.

Next, a separator according to an embodiment will be described in detail. The separator may be manufactured by the method for manufacturing a separator according to embodiments described above. For example, the separator may contain a polyolefin resin and may have an air permeability change of 6% or less after compression, as represented by Equation 1:

$$\text{air permeability change after compression} = [(P_1 - P_0)/P_0] \times 100 \quad (1).$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

For example, the air permeability change after compression may be 5% or less, 4% or less, or 3% or less. Maintaining the air permeability change after compression within this range may help minimize deformation and change in size of the pores of the separator, for example, due to heat and pressure, and battery stability may be improved. The polyolefin separator may have a high inflection point, may undergo small deformation of the pores even under severe conditions, and the separator may have a small air permeability change after compression.

The air permeability change after compression may be measured by, for example, the following method. First, a separator specimen is cut to a size of 70 mm×70 mm, and air permeability is measured within four circles, which have a diameter of 1 inch and a center point separated a distance of 2 cm from each of four corners of a separator specimen, using an air permeability measurement apparatus (for example, model: EG01-55-1 MR, Asahi Seiko Co., Ltd.). Thereafter, an average value is calculated and taken as air permeability before compression, $P_0$ (sec/100 cc). Then, the same separator specimen is placed on a hot press machine set to a temperature of 70° C. to 90° C. and then subjected to compression at a pressure of 5 bar to 15 bar for 1 minute to 5 minutes, followed by measuring air permeability within the same four circles. Next, an average value is calculated and taken as air permeability after compression, $P_1$ (sec/100 cc). Then, the air permeability change after compression is calculated by Equation 1.

The polyolefin separator according to embodiments may be a porous film having a porosity of 40% to 60% and an air permeability of 5 sec/100 cc·μm to 15 sec/100 cc·μm. As used herein, the air permeability refers to time for which 100 cc of air passes through 1 μm thickness of the separator. For example, the separator may have an air permeability from 5 sec/100 cc·μm to 10 sec/100 cc·μm.

The polyolefin separator according to embodiments may have an average thickness from 7 μm to 20 μm and a thickness deviation of less than 4% of the average thickness.

The polyolefin separator according to embodiments may have an average puncture strength of 300 gf or more, for example, 400 gf or more. The porous polyolefin separator may have an average longitudinal tensile strength of 1600 kgf/cm$^2$ or more and an average transverse tensile strength of 1800 kgf/cm$^2$ or more.

The polyolefin separator according to embodiments may have a longitudinal shrinkage of 5% or less and a transverse shrinkage of 3% or less at 105° C., for example, a longitudinal shrinkage of 4% or less and a transverse shrinkage of 2% or less at 105° C. or a longitudinal shrinkage of 3% or less and a transverse shrinkage of 1% or less. The polyolefin separator may have a longitudinal shrinkage of 8% or less and a transverse shrinkage of 5% or less at 120° C., for example, a longitudinal shrinkage of 6% or less and a transverse shrinkage of 3% or less at 120° C. or a longitudinal shrinkage of 5% or less and a transverse shrinkage of 4% or less at 120° C., for example, a longitudinal shrinkage of 4% or less and a transverse shrinkage of 2% or less at 120° C. The longitudinal and transverse shrinkage of the polyolefin separator may be measured by placing a separator specimen cut to a size of 50 mm×50 mm in an oven at 105° C. or 120° C. for 1 hour under shrinkage conditions, followed by measuring a reduced size of the shrunk separator and calculating the longitudinal and transverse shrinkage. Increase rates of the longitudinal and transverse shrinkages at 120° C. compared to the longitudinal and transverse shrinkages at 105° C. may be less than or equal to 60%, for example, less than or equal to 55%, respectively.

Hereinafter, a separator according to a further embodiment will be described in detail. The separator may further include a coating layer on one or both surfaces of the polyolefin separator according to embodiments described above.

The separator may have an air permeability change of 6% or less after compression, as represented by Equation 1:

$$\text{air permeability change after compression} = [(P_1 - P_0)/P_0] \times 100 \quad (1),$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

The polyolefin separator may have a porosity of 40% to 60% and an air permeability of 5 sec/100 cc·μm to 15 sec/100 cc·μm, for example, 5 sec/100 cc·μm to 10 sec/100 cc·μm.

Also provided is an electrochemical battery including the porous polyolefin separator according to embodiments, a cathode, an anode, and an electrolyte. The electrochemical battery may be a lithium secondary battery such as, for example, a lithium metal secondary battery, a lithium ion secondary battery, a lithium polymer secondary battery, or a lithium ion polymer secondary battery.

The electrochemical battery may be manufactured, for example, by disposing a separator including an organic and inorganic mixture coating layer between a cathode and an anode, followed by filling the battery with an electrolyte. Electrodes used in the electrochemical battery may be fabricated in a form in which an electrode active material is coupled to an electrode current collector. The cathode may include a cathode active material into and from which lithium ions may be reversibly inserted and removed, and the cathode active material may be a complex metal oxide of lithium with one or more of cobalt, manganese, or nickel. Metals may be dissolved in various ratios. In addition to these metals, the cathode may further include an element selected from Mg, Al, Co, Ni, K, Na, Ca, Si, Ti, Sn, V, Ge, Ga, B, As, Zr, Mn, Cr, Fe, Sr, V and rare earth elements. The cathode may be, for example, a complex metal oxide of lithium with a metal selected from Co, Ni, Mn, Al, Si, Ti and Fe. For example, the cathode may include lithium cobalt oxide (LCO) (for example, LiCoO$_2$), lithium nickel manganese cobalt oxide (NCM) (for example, Li[Ni(x)Co(y)Mn(z)]O$_2$), lithium manganese oxide (LMO) (for example, LiMn$_2$O$_4$, LiMnO$_2$), lithium iron phosphate (LFP) (for example, LiFePO$_4$), or lithium nickel oxide (LNO) (for example, LiNiO$_2$). The anode may include an anode active material into and from which lithium ions may be inserted and removed, and the anode active material may include crystalline and amorphous carbon, carbon anode active materials of carbon composites (thermally decomposed carbon, coke, graphite), burned organic polymer compounds, carbon fibers, tin oxide compounds, lithium metal, and alloys of lithium with other elements. For example, amorphous carbon includes hard carbon, coke, mesocarbon microbeads (MCMBs) sintered at 1500° C. or less, and mesophase pitch-based carbon fibers (MPCFs). Crystalline carbon includes graphite-based materials, for example, natural graphite, graphitized coke, graphitized MCMBs, and graphitized MPCFs. The anode may include, for example, crystalline or amorphous carbon.

The cathode or anode may be manufactured by preparing an electrode slurry composition by dispersing a binder, a conductive material, an, optionally, a viscosity increasing agent in a solvent, followed by coating the slurry composition onto an electrode current collector. The binder may be, for example, polyvinylidene-fluoride (PVdF) or styrene-butadiene rubber (SBR), the conductive material may be carbon black, and the viscosity increasing agent may be carboxy methyl cellulose (CMC).

Examples of materials for a cathode current collector among the electrode current collectors may include foils formed of, for example, aluminum, nickel or combinations thereof. Examples of materials for an anode current collector among the electrode current collectors may include foils formed of, for example, copper, gold, nickel, copper alloys or combinations thereof.

The cathode and anode current collectors may have a foil or mesh shape.

The electrolyte may include an electrolyte in which a salt having a structure such as A$^+$B$^-$ is dissolved or dissociated in an organic solvent. Examples of A$^+$ may include alkali metal cations including, for example, Li$^+$, Na$^+$, K$^+$, and combinations thereof. Examples of B$^-$ may include anions including, for example, PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$, C(CF$_2$SO$_2$)$_3^-$, and combinations thereof. Examples of the organic solvent may include, for example, propylene carbonate (PC), ethylene carbonate (EC), diethyl carbonate (DEC), dimethyl carbonate (DMC), dimethylformamide (DMF), dipropyl carbonate (DPC), dimethyl sulfoxide (DMSO), acetonitrile, dimethoxyethane, diethoxyethane, tetrahydrofuran, N-methyl-2-pyrrolidone (NMP), ethyl methyl carbonate (EMC), and γ-butyrolactone. These may be used alone or in combination thereof.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

Manufacture of Porous Polyolefin Separator

High-density polyethylene (HDPE, Mitsui Chemical Co., Ltd.) having a viscosity average molecular weight (Mv) of 600,000 g/mol was supplied to a twin-screw extruder, followed by injecting liquid paraffin (Kukdong Oil & Chemicals Co., Ltd.) into the twin-screw extruder such that a weight ratio of polyethylene to liquid paraffin became 30:70, thereby performing extrusion.

After extrusion, a gel phase obtained via a T-die was formed into a separator of a sheet form using cooling rolls. The separator was subjected to machine direction (MD) stretching at 110° C. and transverse direction (TD) stretching at 113° C. (stretching ratios: 7.5(MD)×8.5(TD)).

The stretched polyolefin separator was dipped into methylene chloride (Samsung Fine Chemical Co., Ltd.) to extract liquid paraffin, followed by transferring the separator to a drying roll to dry the separator.

Next, the dried film was subjected to heat setting for secondary stretching in a transverse direction (transverse stretching ratio: 1.0→1.4→1.2, stretching temperature: 128° C.), thereby manufacturing a 12.5 µm thick porous polyolefin separator.

Example 2

Manufacture of Porous Polyolefin Separator

A 11.8 µm thick porous polyolefin separator was manufactured in the same manner as in Example 1 except that machine direction (MD) stretching at 103° C. and transverse direction (TD) stretching at 105° C. (stretching ratios: 8.5 (MD)×8.5(TD)) were performed.

Example 3

Manufacture of Coating Layer-Containing Porous Polyolefin Separator (1) Preparation of Coating Liquid Composition 1) 10 wt % of polyvinylidene fluoride-hexafluoropropylene (hereinafter, PVdF-HFP) copolymer (Solvay Co., Ltd.) having a weight average molecular weight of 700,000 g/mol was added to acetone (Daejung Chemicals & Metals Co., Ltd.), followed by stirring at 25° C. for 4 hours using a stirrer, thereby preparing a first polymer solution.

2) 10 wt % of polyvinylidene fluoride (hereinafter, PVdF) homopolymer (Solvay Co., Ltd.) having a weight average molecular weight of 1,100,000 g/mol was added to DMF (Daejung Chemicals & Metals Co., Ltd.), followed by stirring at 25° C. for 4 hours using a stirrer, thereby preparing a second polymer solution.

3) 25 wt % of alumina (Nippon Light Metal Co., Ltd.) was added to acetone (Daejung Chemicals & Metals Co., Ltd.), followed by milling at 25° C. for 3 hours using a ball mill, thereby preparing an inorganic dispersion.

The first polymer solution, the second polymer solution and the inorganic dispersion, were mixed in a composition weight ratio of first polymer solution:second polymer solution:inorganic dispersion:solvent (acetone)=1:1:3:6, followed by stirring at 25° C. for 2 hours using a power mixer, thereby preparing a coating liquid composition.

(2) Manufacture of Coating Layer-Containing Separator

The prepared coating liquid composition was coated onto both surfaces of the polyolefin separator of Example 1 by dip coating such that a coating layer on one surface had a thickness of 2 µm, followed by drying, thereby manufacturing a separator.

Example 4

Manufacture of Coating Layer-Containing Porous Polyolefin Separator

A coating layer-containing separator was manufactured in the same manner as in Example 3 except that the polyolefin separator manufactured in Example 2 was used.

Comparative Example 1

Manufacture of Porous Polyolefin Separator

A separator was manufactured in the same manner as in Example 1 except that MD stretching at 125° C. and TD stretching at 125° C. (stretching ratios: 8(MD)×8(TD)) were performed.

Comparative Example 2

Manufacture of Porous Polyolefin Separator

A separator was manufactured in the same manner as in Example 1 except that MD stretching at 103° C. and TD stretching at 105° C. (stretching ratios: 7(MD)×7(TD)) were performed.

Comparative Example 3

Manufacture of Porous Polyolefin Separator

A separator was manufactured in the same manner as in Example 1 except that MD stretching at 125° C. and TD stretching at 125° C. (stretching ratios: 7(MD)×7(TD)) were performed.

Comparative Example 4

Coating Layer-Containing Porous Polyolefin Separator

A coating layer-containing separator was manufactured in the same manner as in Example 3 except that the polyolefin separator manufactured in Comparative Example 1 was used.

Comparative Example 5

Coating Layer-Containing Porous Polyolefin Separator

A coating layer-containing separator was manufactured in the same manner as in Example 3 except that the polyolefin separator manufactured in Comparative Example 2 was used.

Manufacture conditions of each of the separators of Examples 1 to 2 and Comparative Examples 1 to 3 are shown in Table 1.

value. Next, the average value was divided by a thickness of the separator, thereby taking the resultant value as air permeability.

TABLE 1

| | | Example 1 | Example 2 | Comparative Example 1 | Comparative Example 2 | Comparative Example 3 |
|---|---|---|---|---|---|---|
| Stretching | Stretching method | Sequential | Sequential | Sequential | Sequential | Sequential |
| | Stretching ratio (MD × TD) | 7.5 × 8.5 | 8.5 × 8.5 | 8 × 8 | 7 × 7 | 7 × 7 |
| | MD stretching temperature | 110° C. | 103° C. | 125° C. | 103° C. | 125° C. |
| | TD stretching temperature | 113° C. | 105° C. | 125° C. | 105° C. | 125° C. |

Experimental Example

Each of the separators manufactured in Examples 1 to 2 and Comparative Examples 1 to 3 was evaluated for porosity, air permeability, puncture strength, shrinkage, first inflection point, and air permeability change after compression by the following methods. Results are shown in Table 2.

TABLE 2

| | Example 1 | Example 2 | Comparative Example 1 | Comparative Example 2 | Comparative Example 3 |
|---|---|---|---|---|---|
| Porosity (%) | 47.8 | 48.3 | 48.7 | 47.2 | 46.9 |
| Air permeability (sec/100 cc · μm) | 9.04 | 8.04 | 6.61 | 11.38 | 10.75 |
| Puncture strength (gf) | 530 | 504 | 510 | 528 | 503 |
| Shrinkage(%) (105° C., 1 hr) (MD, TD) | 3/0 | 3/0 | 3/0 | 3/0 | 3/0 |
| Shrinkage(%) (120° C., 1 hr) (MD, TD) | 4.5/0 | 4.5/0 | 5/0 | 5/0 | 5/0 |
| First inflection point | 121.2 psi | 119.5 psi | 109.8 psi | 108.4 psi | 97.1 psi |
| Air permeability change after compression (%) | +2 | +2.5 | +8 | +9 | +11 |

1. Porosity

Each of the separators prepared in Examples 1 to 2 and Comparative Examples 1 to 3 was cut into specimens having a size of 10 cm×10 cm, followed by measuring volume (cm$^3$) and mass (g) thereof. Next, porosity was calculated by the following equation using the volume, mass and density (g/cm$^3$) of each specimen.

Porosity (%)=(Volume−Mass/Density of specimen)/Volume×100

Density of specimen=Density of polyethylene

2. Air Permeability

Each of the separators prepared in Examples and Comparative Examples was manufactured into ten specimens cut to a size, within which a 1 inch diameter circle was included, at ten different positions, followed by measuring time for which 100 cc of air passed through each of the specimens using an air permeability measuring apparatus (model: EG01-55-1 MR, Asahi Seiko Co., Ltd.). The time was measured five times, followed by calculation of an average value. Next, the average value was divided by a thickness of the separator, thereby taking the resultant value as air permeability.

3. Puncture Strength

Each of the separators manufactured in Examples and Comparative Examples was manufactured into ten specimens having a size of 50 mm×50 mm (MD×TD) at ten different positions. Next, each of the specimens was placed on a 10 cm diameter hole using a G5 apparatus (GATO Tech. Co., Ltd.), followed by measuring force causing the specimen to be punctured while pressing the specimen using a 1 mm probe. Puncture strength was measured three times on each of the specimens, followed by calculation of an average value.

4. Shrinkage

Each of the separators manufactured in Examples and Comparative Examples was manufactured into ten specimens having a size of 50 mm×50 mm (MD×TD) at ten different positions. Each of the specimens was left alone in an oven at 105° C. for 1 hour, followed by measuring degrees of MD and TD shrinkage of the specimen, thereby calculating average thermal shrinkage. Each of the ten specimens was left alone in an oven at 120° C. for 1 hour, followed by measuring degrees of MD and TD shrinkage of the specimen, thereby calculating average thermal shrinkage.

5. First Inflection Point on Capillary Flow Porometry Graph

Each of the separators manufactured in Examples and Comparative Examples was subjected to sampling into a 26 mm diameter circle using a capillary flow porometer (PMI Co., Ltd.). The separator was mounted on the apparatus, followed by measuring flow rate of $N_2$ according to pressure to obtain a drying curve graph. After obtaining a straight line extending from the origin to a point having linearity on the drying curve graph, a point at which the straight line finally meets the graph was taken as a first inflection point.

6. Air Permeability Change after Compression

Each of the separators manufactured in Examples and Comparative Examples was cut to a size of 70 mm×70 mm. Using the air permeability measuring apparatus as set forth in 2, air permeability was measured within four circles which had a diameter of 1 inch and had a center point separated a distance of 2 cm from four corners of the separator, respectively, followed by calculating an average value (air permeability before compression, $P_0$). Next, the separator was placed on a hot press machine set to 80° C. and then pressed at a pressure of 10 bar for 5 minutes. The pressed sample was taken out and measured for air permeability within the same four circles, thereby calculating an average value (air permeability after compression, $P_1$). Air permeability change after compression was calculated by Equation 1:

$$\text{air permeability change after compression} = [(P_1-P_0)/P_0] \times 100 \quad (1)$$

Each of the coating layer-containing separators manufactured in Examples 3 to 4 and Comparative Examples 4 to 5 was evaluated for thermal shrinkage, air permeability, and air permeability change after compression by the methods described above. Results are shown in Table 3.

TABLE 3

|  | Example 3 | Example 4 | Comparative Example 4 | Comparative Example 5 |
|---|---|---|---|---|
| Coating thickness (μm) | 4 | 4 | 4 | 4 |
| Air permeability (sec/100 cc · μm) | 8.0 | 7.25 | 6.19 | 9.75 |
| Shrinkage (105° C., 1 hr) (MD, TD) | 1/0 | 1/0 | 1/0 | 1/0 |
| Shrinkage (120° C., 1 hr) (MD, TD) | 3/0 | 3/0 | 3/0 | 3/0 |
| Air permeability change after compression (%) | +1 | +2 | +7 | +8 |

By way of summation and review, smaller and lighter weight electrochemical batteries for improvement of portability of electronics may require high-power large-capacity batteries for use in, for example, electric vehicles, and a separator for batteries needs to be thin and light weight, while exhibiting excellent shape stability against high heat or high tension for improvement in productivity of high-capacity batteries. Higher pressure may be applied to the separator in a longitudinal direction than in a transverse direction, for example, due to winding of the separator in the longitudinal direction, and pores of the separator may suffer from deformation and change in size in the longitudinal direction. Deformation and change in size of the pores may lead to deterioration in battery stability or battery performance.

Provided is a separator that may secure excellent stability of battery performance by suppressing deformation and change in size of the pores of the separator, for example, due to external environments, while satisfying fundamental properties such as, for example, air permeability, porosity, thermal shrinkage, shutdown properties, and meltdown properties.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for manufacturing a polyolefin separator, the method comprising:
   forming a sheet including a polyolefin resin and a plasticizer;
   stretching the sheet $E_1$ times in a longitudinal direction at a temperature of $T_1$, followed by stretching the sheet $E_2$ times in a transverse direction at a temperature of $T_2$, wherein $T_1<115°$ C., $T_2<115°$ C., and $T_2>T_1$, and $E_1 \times E_2 = 55$ to 80, $E_1 \geq 7$, and $E_2 \geq 7$; and
   extracting the plasticizer from the stretched sheet.

2. The method as claimed in claim 1, wherein a ratio of $E_1/E_2$ ranges from 0.85 to 1.

3. The method as claimed in claim 1, wherein the polyolefin resin includes one or more of a high-density polyethylene having a viscosity average molecular weight from $1 \times 10^5$ g/mol to $9 \times 10^5$ g/mol or an ultrahigh-molecular weight polyethylene having a viscosity average molecular weight of $9 \times 10^5$ g/mol or more.

4. The method as claimed in claim 1, further comprising performing heat setting after extracting the plasticizer.

5. The method as claimed in claim 4, wherein performing heat setting includes stretching the sheet in a ratio of 1 to 2 times in the transverse direction and relaxing the sheet to 80% to 100% with respect to the length of the sheet stretched in the transverse direction.

6. The method as claimed in claim 4, further comprising forming a coating layer on one or both surfaces of the polyolefin separator after heat setting.

7. The method as claimed in claim 1, further comprising forming a coating layer on one or both surfaces of the polyolefin separator after extracting the plasticizer.

8. A polyolefin separator, comprising:
   a polyolefin resin,
   the polyolefin separator having a first inflection point of 110 psi or more on a drying curve of the separator as measured using a capillary flow porometer.

9. The polyolefin separator as claimed in claim 8, further comprising a coating layer on one or both surfaces of the polyolefin separator.

10. The polyolefin separator as claimed in claim 9, wherein the polyolefin separator has an air permeability of 5 sec/100 cc·μm to 15 sec/100 cc·μm.

11. The polyolefin separator as claimed in claim 9, wherein the polyolefin separator has an air permeability change of 6% or less after compression thereof, as represented by Equation 1:

$$\text{air permeability change after compression} = [(P_1-P_0)/P_0] \times 100 \quad (1),$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

12. The polyolefin separator as claimed in claim 8, wherein the polyolefin separator has a porosity of 40% to 60%.

13. The polyolefin separator as claimed in claim 8, wherein the polyolefin separator has an air permeability of 5 sec/100 cc·μm to 15 sec/100 cc·μm.

14. The polyolefin separator as claimed in claim 8, wherein the polyolefin separator has an air permeability change of 6% or less after compression thereof, as represented by Equation 1:

$$\text{air permeability change after compression} = [(P_1 - P_0)/P_0] \times 100 \qquad (1),$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

15. The polyolefin separator as claimed in claim 8, wherein the polyolefin resin includes one or more of a high-density polyethylene having a viscosity average molecular weight from $1 \times 10^5$ g/mol to $9 \times 10^5$ g/mol or an ultrahigh-molecular weight polyethylene having a viscosity average molecular weight of greater than $9 \times 10^5$ g/mol.

16. The polyolefin separator as claimed in claim 8, wherein the polyolefin separator is stretched $E_1$ times in a longitudinal direction at a temperature of $T_1$ and then stretched $E_2$ times in a transverse direction at a temperature of $T_2$, wherein $T_1 < 115°$ C., $T_2 < 115°$ C., and $T_2 > T_1$, and $E_1 \times E_2 = 55$ to $80$, $E_1 \geq 7$, and $E_2 \geq 7$.

17. The polyolefin separator as claimed in claim 16, wherein a ratio of $E_1/E_2$ ranges from 0.85 to 1.

18. An electrochemical battery, comprising the polyolefin separator as claimed in claim 8.

19. A polyolefin separator, comprising:
a polyolefin resin,
the polyolefin separator having an air permeability change of 6% or less after compression thereof, as represented by Equation 1:

$$\text{air permeability change after compression} = [(P_1 - P_0/P_0] \times 100 \qquad (1),$$

wherein $P_0$ represents an air permeability (sec/100 cc) measured before compression of the polyolefin separator, and $P_1$ represents an air permeability (sec/100 cc) measured after the polyolefin separator is placed on a hot press machine set to a temperature of 70° C. to 90° C. and then subjected to compression at a pressure of 5 bar to 15 bar for 1 minute to 5 minutes.

20. The polyolefin separator as claimed in claim 19, further comprising a coating layer on one or both surfaces of the polyolefin separator.

\* \* \* \* \*